March 20, 1928.

R. MILLER

MARINE VESSEL

Filed Aug. 3 1927 6 Sheets-Sheet 2

INVENTOR.
Rudolph Miller,
BY
Geo. P. Kimmel ATTORNEY.

March 20, 1928.

R. MILLER

MARINE VESSEL

Filed Aug. 3, 1927

INVENTOR.
Rudolph Miller,
BY
Geo. P. Kimmel
ATTORNEY.

March 20, 1928.

R. MILLER

MARINE VESSEL

Filed Aug. 3 1927

R. MILLER

MARINE VESSEL

Filed Aug. 3, 1927

INVENTOR.
Rudolph Miller,
BY
Geo. P. Kimmel ATTORNEY.

Patented Mar. 20, 1928.

1,663,347

UNITED STATES PATENT OFFICE.

RUDOLPH MILLER, OF DETROIT, MICHIGAN, ASSIGNOR OF ONE-HALF TO LOUIS C. LA COURSIERE, OF DETROIT, MICHIGAN.

MARINE VESSEL.

Application filed August 3, 1927. Serial No. 210,344.

This invention relates to marine vessels and has for its object to provide, in a manner as set forth, a vessel of such class including new and improved means to cause circulation of air therethrough when the windows, doors and hatchways thereof are closed.

A further object of the invention is to provide, in a manner as hereinafter set forth, a vessel of the class referred to driven from an internal combustion engine and provided forward thereof with new and improved means for storing the fuel for the engine.

A further object of the invention is to provide, in a manner as hereinafter set forth, a vessel of the class referred to driven by an internal combustion engine and including new and improved means for discharging the engine exhaust at the stern of the vessel and above the water level and with said means constructed and arranged to prevent the entrance of water thereto.

A further object of the invention is to provide, in a manner as hereinafter set forth, a vessel of the class referred to with new and improved steering mechanism for the vessel.

A further object of the invention is to provide, in a manner as hereinafter set forth, a vessel of the class referred to capable of being completely closed in the case of inclement weather.

A further object of the invention is to provide, in a manner as hereinafter set forth, a vessel of the class referred to including a pair of ventilators, one arranged fore and the other aft and with the ventilators having means associated therewith to provide for the simultaneously opening and closing of the same.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 3 is a longitudinal sectional view of the vessel.

Figure 4:
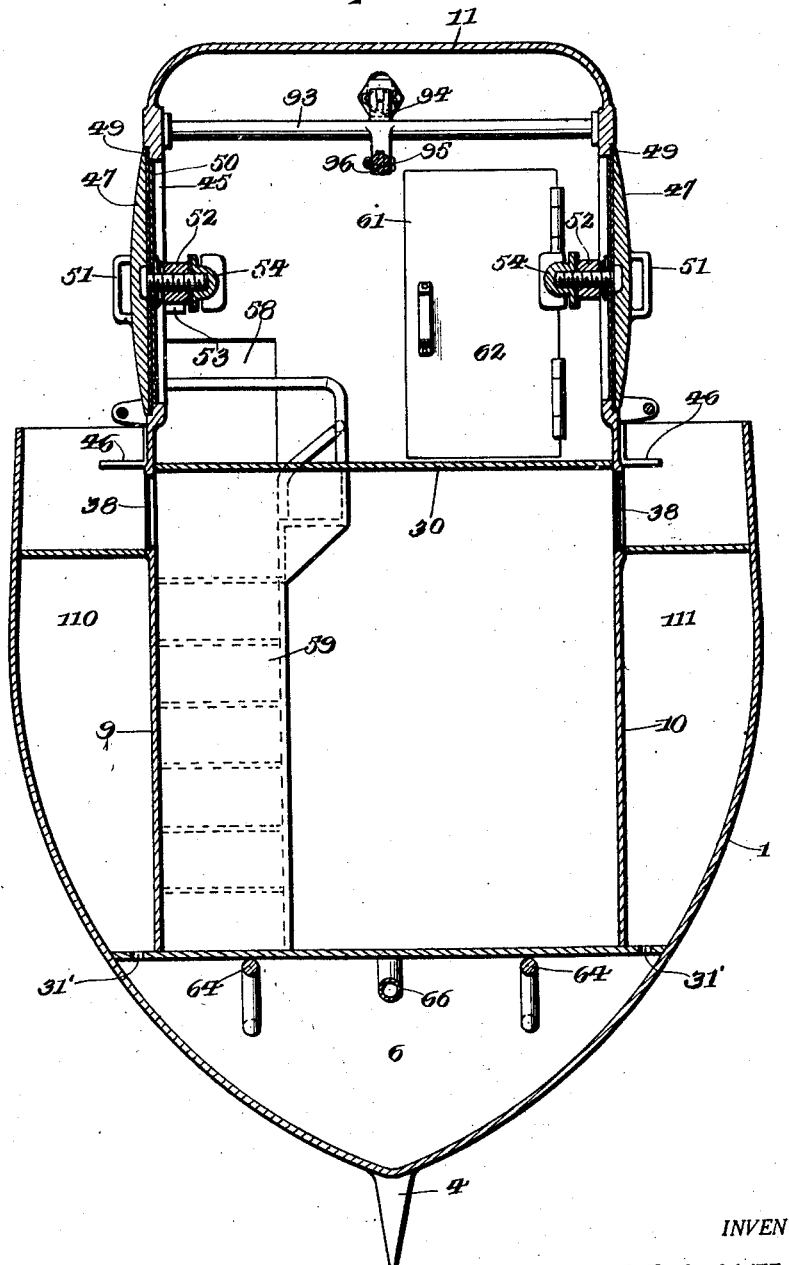
Figure 5:
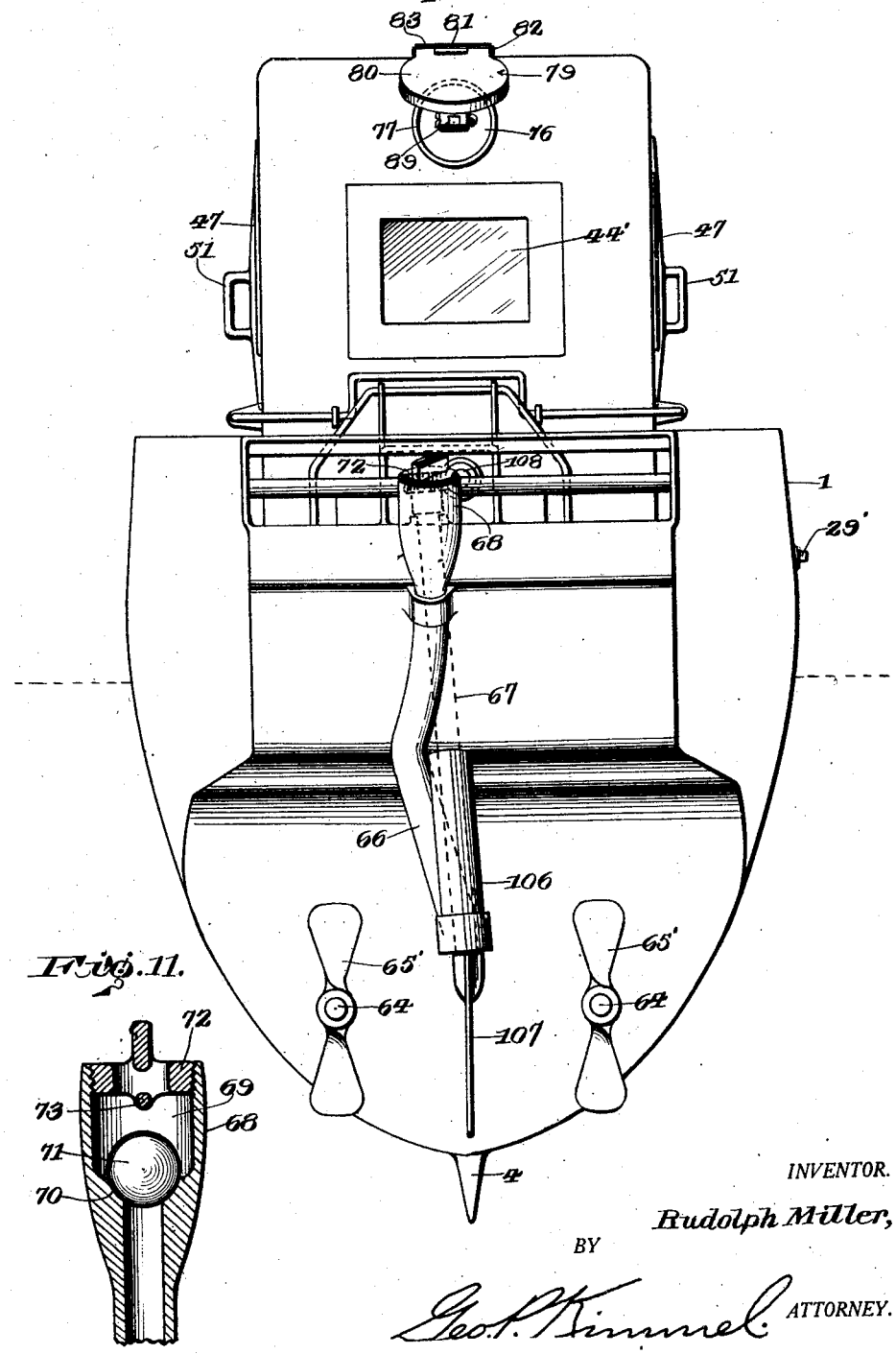
Figure 6:
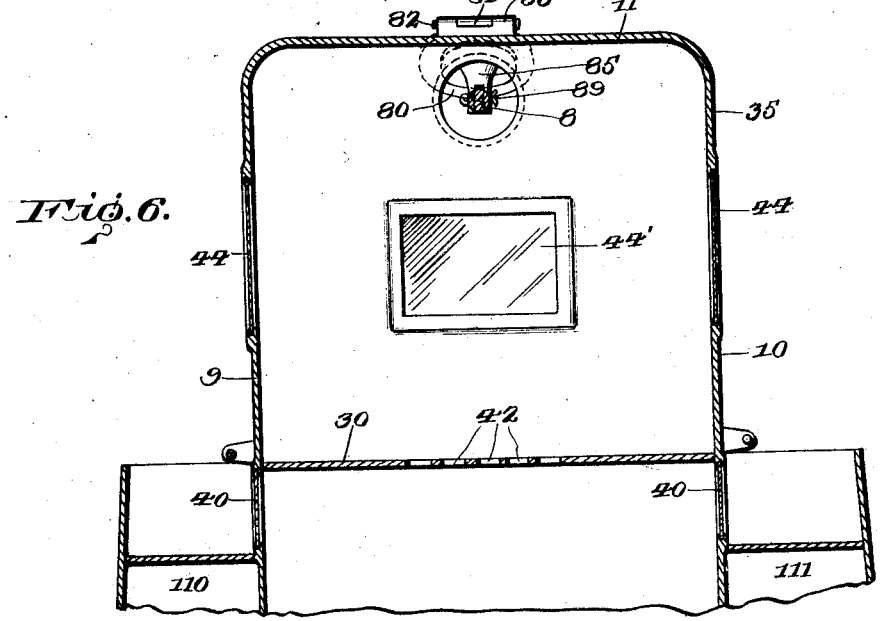
Figure 7:
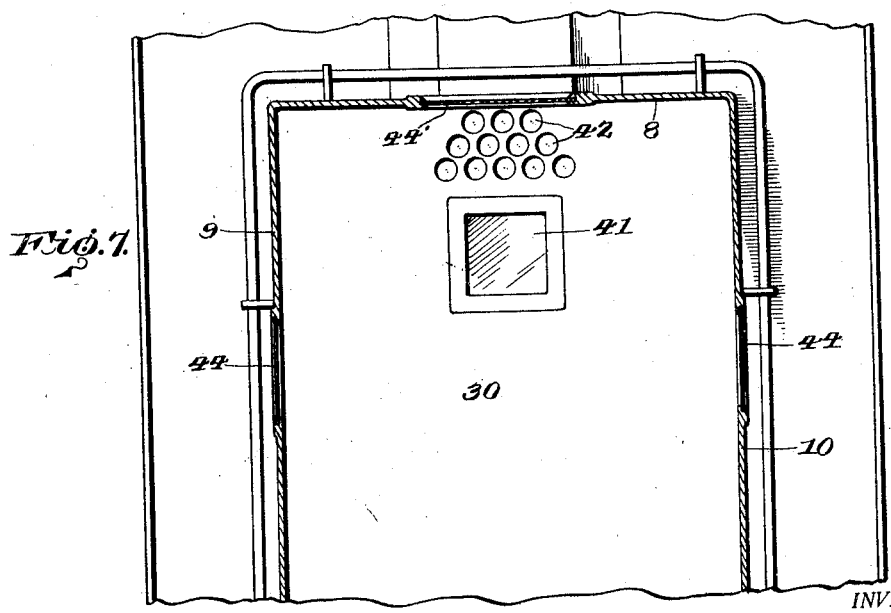

Figure 4 is a section on line 4—4 Figure 3.
Figure 5 is a rear elevation of the vessel.
Figure 6 is a section on line 6—6 Figure 3.
Figure 7 is a section on line 7—7 Figure 3.
Figure 8 is a section on line 8—8 Figure 3.
Figure 9 is a section on line 9—9 Figure 8.

Figure 10 is a detail illustrating the ratch forming a part of the shifting mechanism for the ventilators.

Figure 11 is a fragmentary view in vertical section of the rear or valved end of the exhaust means for the internal combustion engine.

Referring to the drawings in detail 1 denotes the hull of the vessel, 2 the bow and 3 the stern. The keel of the hull is indicated at 4. The lower deck is indicated at 5 and is arranged a substantial distance above the bottom of the hull thereby providing, in connection with the bottom of the hull, a compartment 6 extending from a point in proximity to the bow 2 to the stern 3.

Figure 1:
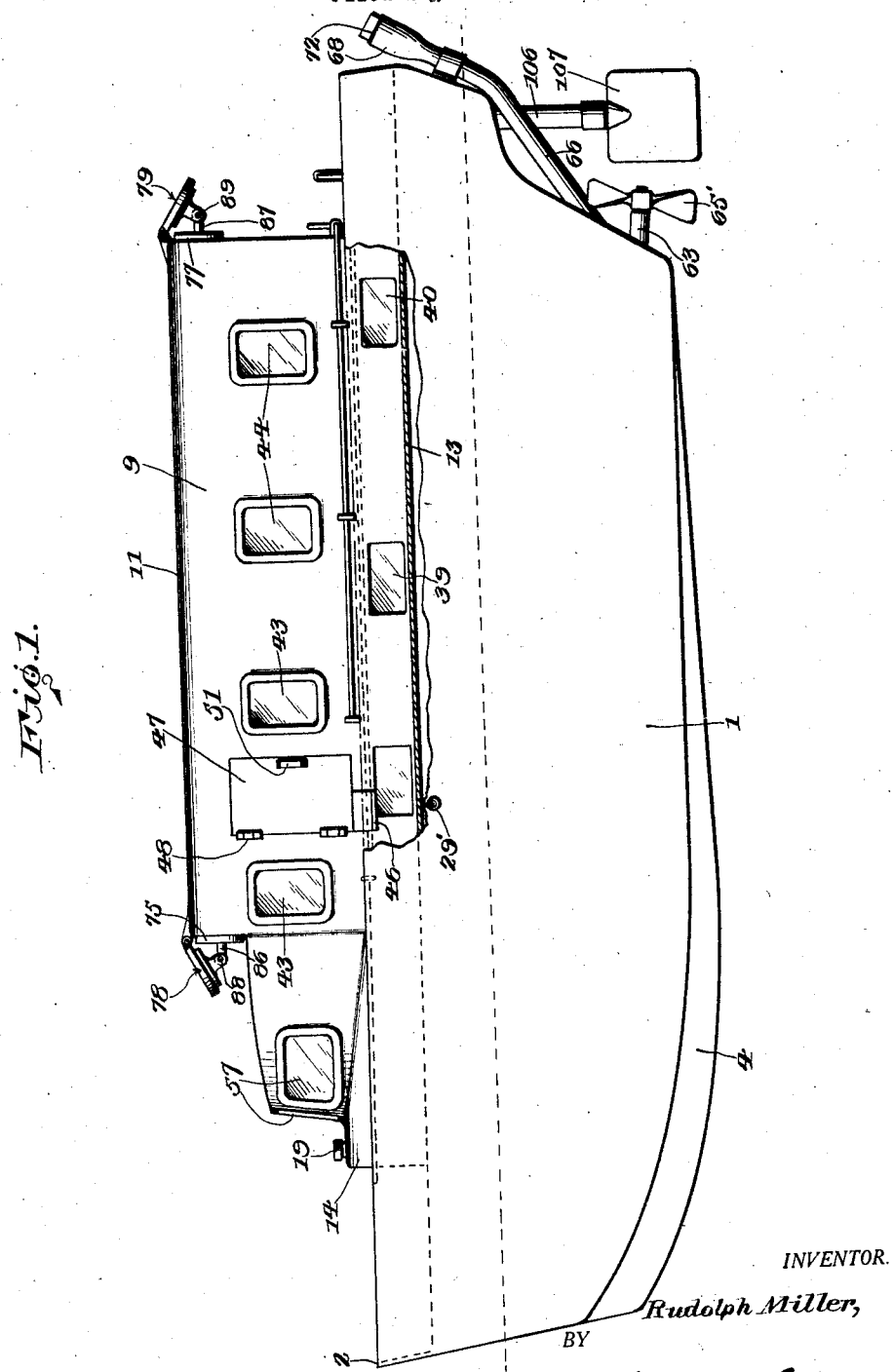
Figure 1 is a side elevation, partly broken away, of a marine vessel in accordance with this invention and with the ventilators shifted to open position.
Figure 2:
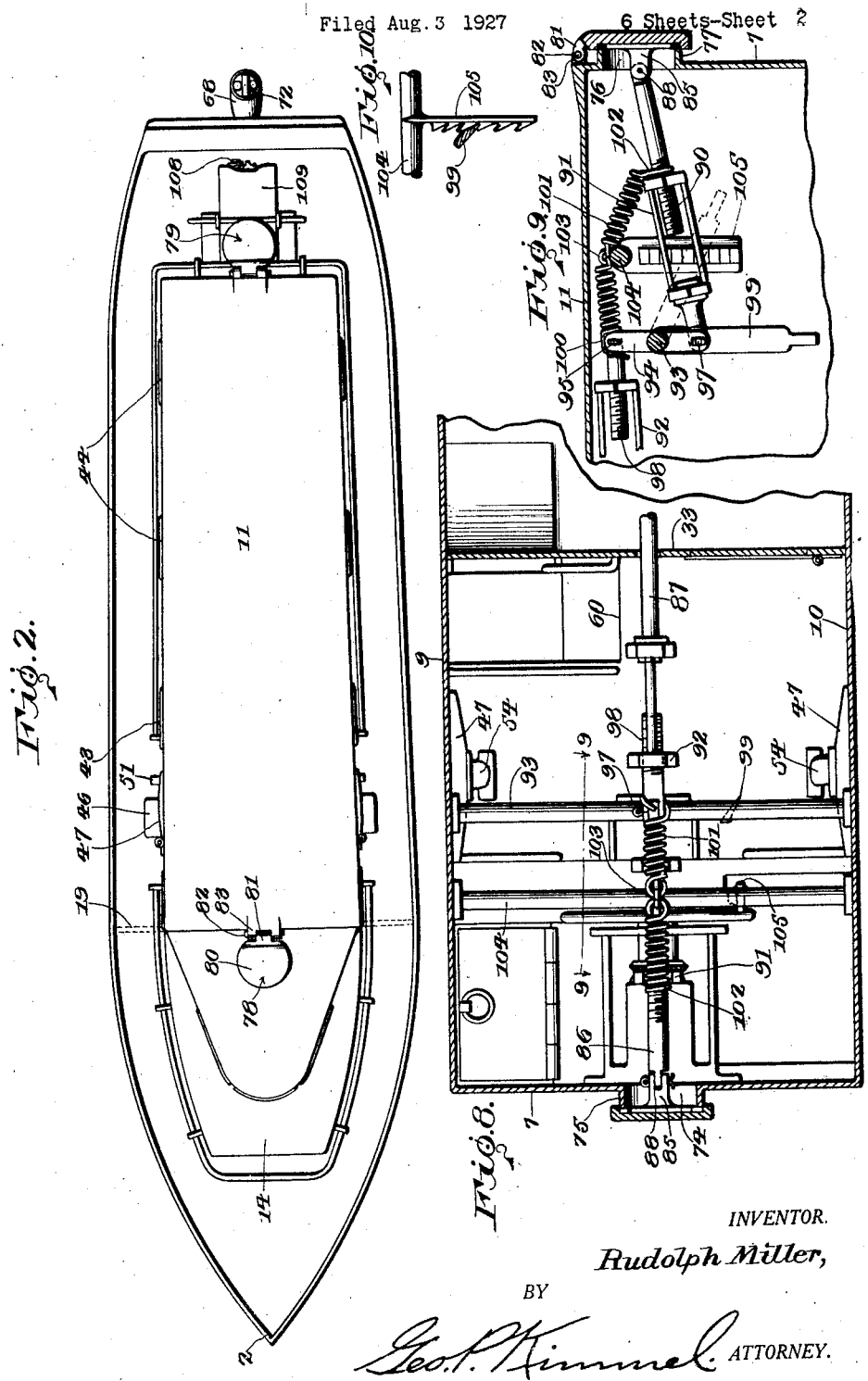
Figure 2 is a top plan view of the vessel and with the ventilators shifted to open position.

Mounted on the lower deck 5 at a point between the transverse median thereof and the bow 2 is a vertically disposed front wall forming member 7 which extends above the hull 1. Mounted on the lower deck 5 at the rear end thereof is a vertically disposed rear wall forming member 8. The members 7 and 8 extend transversely with respect to the hull. Mounted upon the lower deck 5, in proximity to the sides of hull, but spaced therefrom, are vertically disposed side wall forming members 9, 10 which project above the hull 1. The members 9 are disposed lengthwise with respect to the hull 1 and are connected to the members 7, 8. The members 9 and 10 terminate in a roof forming member 11 and which is connected to the members 7, 8. Secured to the wall forming member 7 and extending therefrom to the bow 2 and positioned a substantial distance below the top of the hull 1 is a horizontally disposed partition member 12. Arranged within the hull, below the top thereof and also above the partition member 12, as well as surrounding the members 7, 8, 9 and 10 is an upper deck forming member 13 which is secured to the bow, stern and sides of the hull and also to the members 7, 8, 9 and 10. The deck forming member 13 forwardly of the wall forming member 7 and rearwardly of the bow 2 is upset as indicated at 14 and with the sides of said upset portion 14 spaced from the sides of the hull. The width of said portion 14 corresponds to the width of the wall forming member 7. The forward part of the upper deck forming member 13, in connection with the upset portion 14 and partition 12 provides a liquid fuel storage chamber 15, and said partition 12 in connection with the wall forming member 7 and the forward part of the lower deck 5 provides an air chamber 18 which is arranged below the fuel storage chamber 15 and said chamber 18 extends from one side to the other side of the hull and from the partition forming member 7 to the bow 2. The upset portion 14 is provided with a normally closed filling opening 19 for the storage chamber 15. Partition members, indicated in dotted lines in Figure 2, and designated 19 are interposed between the wall forming member 7 and the sides of the hull to complete, in connection with the lower portion of the member 7, the rear wall of the storage chamber 18. The partition members 19 are arranged below the upper deck forming member 13.

The lower deck 5, in proximity to the wall forming member 7, is provided with an opening 20 from which depends into the compartment or space 6 a support 21 for an internal combustion engine 22. The lower deck 5 is also formed with a pair of openings 23 arranged in spaced relation and extending lengthwise of said deck and which project rearwardly from the top of the support 21. Secured to the lower deck 5 is a vertically disposed partition member 24 having a forwardly directed upper portion consisting of a longitudinally extending part 25, and a vertically extending part 26. The partition member is arranged in proximity to the member 7 but is spaced therefrom and forms in connection with said member 7 and support 21 an engine room 27. Extending from the storage chamber 15, through the rear of the chamber 18, thence through the member 7 and coupled with the engine 22 is a fuel supply pipe 28. The partition member 24 is formed with a door opening 29.

Secured at its rear end to the wall forming member 8, is a flat longitudinally extending partition member 30 having a downturned forward end which seats upon the part 25 and is secured thereto. The downturned forward end 31 of the member 30 is spaced from the part 26, rearwardly thereof. The members 9, 10, in connection with the deck 5, and partitions 24, 30 provide a compartment or chamber 32. Extending upwardly from the partition member 30 to the roof 11 is a partition member 33 which in connection with the members 7, 8, 9 and 10, roof 11 and partition 30 provide a pair of compartments or chambers 34, 35 and with one arranged in advance of the other and with the forward chamber positioned over the engine room 27 and also partly over the chamber 32.

Interposed between the member 7 and part 26 of the partition 24, as well as being secured to said member and part 26, is a vertically disposed support 36 carrying an operating means 37 for the steering shaft 38 and the latter is geared with the operating or actuating means 37 and is journaled in the part 26, downturned end 31 and wall forming member 8. The shaft 38 is disposed at the longitudinal center of the vessel and in proximity to, but below the partition member 30.

The walls of the engine chamber 27 are provided by the members 7, 9, 10 and partition 24 and the bottom of said chamber or room is provided by the lower deck 5 and support 21. The chamber 34 is the pilot's room or house and the walls thereof are provided by the members 7, 9 and 10, the partition 33 and the ceiling of the chamber 34 is formed by part of the roof 11 and its bottom by a portion of the partition 30, that is to say its floor formed by a portion of the partition 30. The floor of the chamber 35 is provided by a portion of the partition 30 and the side walls by the members 9, 10, the back wall by the member 8 and the front wall by the partition 33. The ceiling of the chamber 38 is provided by a portion of the roof 11.

The walls of the chamber 32 are provided by the partition 24 and members 8, 9 and 10, the floor of the room 32 by the portion of the lower deck 5 and the ceiling or top of the chamber 32 by a portion of the partition 30.

The ceiling, formed by a portion of the partition 30, for the chamber 32 is arranged above the upper deck forming member 13 and each of the members 9, 10, at a point directly below the partition member 30, is provided with a pair of transparent panels 39, 40 to provide for light entering the chamber 32. The partition member 30 at a point in proximity to but removed from its rear end is formed with a transparent panel 41 for the passage of light to the chamber 32. The partition member 30 rearwardly of the panel 41 is formed with a series of openings 42 for the passage of air from the chamber 32 to the chamber 35 or from the latter to the former. The member 9, as well as the member 10 is provided with a plurality of transparent panels 43 for transmitting light to the chamber 34. The member 9, as well as the member 10 is provided with a plurality of transparent panels 44 for admitting light to the chamber 35.

The member 9, as well as the member 10 is formed with a door opening 45 so that access can be had from the deck 13 to the chamber 34. Steps 46 are secured to the members 9, 10 below the door openings 45. The openings 45 are closed by doors 47 which are hinged, as at 48 to said members and these latter are rabbeted as at 49 providing seats for the doors 47 and each of these latter has its inner face formed with a packing element 50. Each door 47 has a handle 51. Pivotally connected to the inner face of each door 47 is a latching member 52 therefor and which is of a length greater than the width of the door for the purpose of abutting against the inner face of a member 9 or 10, to prevent the opening of the door. A stop 53 is provided for one end of each latching means or member and the stop 53 is arranged on the inner face of a panel of a member 9 or 10, see Figure 3. The latching means include a clamping cap 54 to securely maintain said means or members in latching position.

The member 7, is provided with a transparent panel 56 and extending from the member 7, and surrounding the panel 55 and secured to the upset portion 14 of the deck 13 is a hollow projection or hood 56, provided in its sides and its forward end with transparent panels 57. The panels 55 and 57 are provided for vision by the pilot. The partition member 33 at one side of the lower portion thereof is provided with an opening 58. A stairway or ladder 59 leads from the chamber 32 to the chamber 34 and is connected with the partition member 30. The opening 58 is arranged in proximity to the upper end of stairway 59. The partition member 30 has an opening 60 therein, at the top of the stairway 59. The partition member 33 has a door opening 60 normally closed by a hinged door 61.

Extending rearwardly from the engine 22, and through the openings 23 at a downward inclination and passing through the compartment or chamber 6 and further extending through sleeves 63 are propeller shafts 64 and each of which has its outer end formed with a propeller 65' and the latter is arranged exteriorly of the lower portion of the stern 3. The propeller shafts 64 are arranged at each side of the compartment or space 6. Disposed at the longitudinal center of the compartment or space 6, is an exhaust means or pipe 66 for the engine 22 and said pipe at its rear end is upturned as at 65 and opens into an upwardly extending and outwardly inclined tubular member 67 which is secured to the stern 3 above the propeller shafts 64 and is twisted in a manner to clear the vertically disposed rudder shaft 67. The upper portion of the tubular member 66 is enlarged as at 68, to provide a valve chamber 69 and the bottom of the latter is constructed to form a valve seat 20 for a check valve 71 of globular form. Secured within the upper end of the member 66 is a cap piece 71 of skeleton form and which provides for the discharge of the exhaust from the member 66 and also acts as a means to arrest the upward movement of the valve 71 when the latter is shifted from its seat. The valve 71 provides means to prevent the entrance of water to the tubular member 66 and the cap piece 71 is removably connected to the upper end of the tubular member 66 and has an offset inner portion 73 acting as a stop for the upward movement of the valve 71, but when the valve 71 is in engagement with the stop 73 it does not interfere with the passage of exhaust through the cap 72.

The wall forming member 7, centrally of its top is provided with a ventilating opening 74 surrounded by a flange 75 formed on the forward face of the member 7. The member 8 centrally of its upper portion is provided with a ventilating opening 76, surrounded by a flange 77 formed on the outer face of the member 8. For the purpose of closing the ventilating opening 74, a ventilator 78 is provided and for the purpose of closing the opening 76 a ventilator 79 is provided. Each of the ventilators is of like construction and each consists of a circular body portion 80, see Figure 2 having provided at one side a lug 81, which extends into and is pivotally connected as at 82, to a bifurcated arm 83. The arms 83 are secured to the ends of the roof 11 and one arm projects forwardly and the other rearwardly. The ventilators 78 and 79 are oppositely disposed with respect to each other and each further include a lug 85 extending from the inner face thereof. The ventilators are simultaneously shifted to open and closed positions and are spring controlled. The ventilators when shifted to open position are latched in such position.

The means for simultaneously shifting the ventilators to open position comprises a pair of rods 86, 87 and the latter is of much greater length than the former. The rods 86 and 87 extending through the openings 74 and 76 respectively. The outer end of the rod 86 is pivotally connected as at 88 to the lug 85 forming a part of the ventilator 78 and the outer end of the rod 87 is pivotally connected as at 89 to the lug 85 forming a part of the ventilator 79. Both rods extend into the chamber 34. The rod 87 extends through the partition member 33. The rod 86 has its inner terminal portion peripherally threaded as at 90 and which threadedly engages with a revoluble combined coupling and adjusting element 91.

Swively connected to the inner end of the rod 87 is a revoluble combined adjusting and coupling element 92. Arranged within the chamber 34 near the upper end thereof is a rock shaft 93 which is disposed transversely of the chamber 34 and is provided intermediate its ends with a lever arm 94. The shaft 93 is connected centrally of the arm 94. The lever arm 94 is disposed at right angles with respect to the direction in which the shaft 93 extends. The forward end of the arm 94 has pivotally connected therewith, as at 95, a link 96 which is swively connected to the rear end of the element 91. The rear end of the arm 93 is pivotally connected as at 97 to a link 98 which threadedly engages with the forward end of the element 92. The shaft 92 has a depending crank arm or handle 99. Connected to the rear end of the lever arm 94, is the rear end 100 of a controlling spring 101 and the forward end 102 of said spring is connected to the rod 96 forwardly of the element 91. The spring 101 is formed of two sections and the opposed ends of said sections are fixedly secured, by a holdfast device 103, to a supporting bar 104 which is arranged in the chamber 34 and positioned above the shaft 93. Depending from the bar 104 is a rack 105, adapted to be engaged by the crank arm 99 for the purpose of latching the ventilators 78, 79 in open position. When the crank arm 99 is moved clear of the rack 105, the spring 101 provides for the automatic closing of the ventilators 78, 79 and these latter are shifted to open position against the action of the controlling spring 101. In Figure 9 of the drawings the actuating or operating mechanism for the ventilators 78 and 79 is illustrated in position to maintain the ventilators closed and in Figure 3 the operating or actuating mechanism for the ventilators is illustrated in full lines in position to maintain the ventilators opened.

The shaft 67 extends downwardly through the rear portion of the stern 3 and also through a depending sleeve 106 which is secured to and depends from the stern. The shaft 67, below the sleeve 106, carries a rudder 107. The shaft 67 extends upwardly through the deck forming member 13 and is operatively connected, as at 108 with the rear end of the shaft 38. A housing 109 is provided for enclosing the rear end of the shaft 38 and the upper end of the rudder shaft 67 and the operative drive connection between said shafts 38 and 67.

It will be assumed that the ventilators are closed and that it is necessary to close the doors 47 on account of inclement weather. Ventilation can be had by opening the ventilators and the air passes through the opening 74 into the chamber 34, then into the chamber 32, up through the openings 42, into the chamber 35 and out through the opening 76. The passage of the air as stated is had when the door 62 is closed. Air from the chamber 32 will pass through the opening 29 into the engine chamber 27. When the actuating mechanism for the ventilators is shifted to open them, such mechanism is latched in shifted position by the engagement of the crank arm 99 with the rack 105. The crank arm 99 and the rack 105 provide means whereby the ventilators can be held in various adjusted positions with respect to the openings 74, 76. Light is also supplied to the chamber 35, by a transparent panel 44' arranged in the wall forming member 8 above the partition member 30.

The wall forming members 8, 9 and 10 in connection with the deck forming members 5, 13 form an air compartment between the rooms 27, 32 and the sides of the hull and between the room 32 and the stern as indicated at 110, 111 and 112, and such air compartment extends from the partitions 19 to the stern. The rudder shaft 67 extends down through the rear portion 112 of the air compartment. The air chamber 18 protects the fuel storage chamber 15. The compartment 6 and air compartment at the sides and stern of the hull aids in buoyancy of the vessel.

Arranged within the engine room 27 is a water pump 27' having water intake lines 28' leading thereto from the compartment or space 6. Extended from the pump 27' is a water discharge line 29' which opens at the side of the hull above the water line and is provided with a check valve 30'. Drain openings 31' are provided between the compartments or spaces 9, 10 and 11 and the compartment or space 6 whereby the water entering from the compartments 9, 10 and 11 will be carried off by the action of the pump 27' in connection with the intake and discharge lines.

It is thought the many advantages of a marine vessel, constructed in accordance with this invention, can be readily understood, and although the preferred embodiment of the invention is as illustrated and described, yet it is to be understood that changes in the details of construction can be had which will fall within the scope of the invention as claimed.

What I claim is:

1. In a marine vessel, a hull, means connected to the hull to provide a lower chamber and a pair of upper chambers, said upper chambers arranged one in advance of the other and each provided with a ventilating opening, the floor of said rear chamber having means for the passage of air thereto from the lower chamber, the bottom of said forward chamber having means for the passage of air from such chamber to the lower chamber, ventilators arranged exteriorly of said upper chambers for controlling said ventilating openings, and means for simultaneously adjusting said ventilators and operated from within said forward chamber.

2. In a marine vessel, a hull, means connected to the hull to provide a lower chamber and a pair of upper chambers, said upper chambers arranged one in advance of the other and each provided with a ventilating opening, the floor of said rear chamber having means for the passage of air thereto from the lower chamber, the bottom of said forward chamber having means for the passage of air from such chamber to the lower chamber, ventilators arranged exteriorly of said upper chambers for controlling said ventilating openings, means for simultaneously adjusting said ventilators and operated from within said forward chamber, and means for latching said ventilators in adjusted position.

3. A marine vessel comprising a hull, an upper deck forming member secured therein and provided with an upset portion near the bow and spaced from the sides of the hull, partition means within the hull at the rear end of the upset portion and extending from one side to the other side of the hull, a partition member extending from said partition means to the bow of the hull and further from one side to the other side of the hull forwardly of the partition means, said upper deck forwardly of said partition means and in connection with the hull, said partition means and partition member providing a liquid fuel storage chamber having its bottom positioned above the bottom of the hull.

4. A marine vessel comprising a hull, an upper deck forming member secured therein and provided with an upset portion near the bow and spaced from the sides of the hull, partition means within the hull at the rear end of the upset portion and extending from one side to the other side of the hull, a partition member extending from said partition means to the bow of the hull and further from one side to the other side of the hull forwardly of the partition means, said upper deck forwardly of said partition means and in connection with the hull, said partition means and partition member providing a liquid fuel storage chamber having its bottom positioned above the bottom of the hull, said upset portion having a normally closed filling opening and said partition member having extending rearwardly therefrom a discharge pipe for the liquid fuel.

5. In a marine vessel of that type driven by an internal combustion engine, a hull having an engine room and a lower deck both spaced from the bottom of the hull, and an exhaust pipe for and extending from the engine within the engine room and arranged below said lower deck, said pipe extending rearwardly and through the stern of the hull and further extending upwardly exteriorly of such stern and provided in its upper end with a check valve to prevent the intake of water.

6. In a marine vessel driven by an internal combustion engine a hull provided intermediate its ends with an engine room and positioned above the bottom of the hull, an air chamber positioned forwardly of said engine room, a liquid fuel storage chamber arranged over said air chamber and forwardly of the engine room, said chamber having a portion of its top projected above said hull and formed with a closable filling opening, and a liquid fuel supply pipe extending from the fuel chamber through the rear of the air chamber and into the engine room or chamber.

7. In a marine vessel, a hull, a lower deck, an upper deck, a structure secured to said decks and extending from the lower deck and through and above the upper deck and spaced from the sides, bow and stern of the hull and providing upper and lower communicating rooms, said lower deck spaced from and in connection with the bottom of the hull providing an air compartment, and said structure in connection with said decks and sides and stern of the hull forming an air compartment extending throughout the sides and rear of the structure.

In testimony whereof, I affix my signature hereto.

RUDOLPH MILLER.